United States Patent [19]

Fertel

[11] Patent Number: 5,346,715

[45] Date of Patent: Sep. 13, 1994

[54] BREADFOOD FREEZING METHOD

[76] Inventor: Robert Fertel, 24 Woodfield Rd., Pomona, N.Y. 10970

[21] Appl. No.: 85,307

[22] Filed: Jun. 30, 1993

[51] Int. Cl.$^5$ ............................................. A21D 6/00
[52] U.S. Cl. ................................... 426/524; 426/497; 426/499; 426/509
[58] Field of Search ............... 426/509, 524, 497, 499, 426/444, 523

[56] References Cited

U.S. PATENT DOCUMENTS

| | | | |
|---|---|---|---|
| 2,479,171 | 8/1945 | Lamperti | 426/524 |
| 3,053,666 | 9/1962 | Henika et al. | 426/96 |
| 3,404,989 | 3/1964 | Hirtensteiner | 426/524 |
| 3,494,770 | 2/1970 | Smerak et al. | 426/549 |
| 3,578,462 | 5/1971 | Smerak et al. | 426/549 |
| 3,934,040 | 1/1976 | Smerak et al. | 426/20 |
| 4,657,769 | 4/1987 | Petrofsky et al. | 426/549 |
| 4,882,984 | 11/1989 | Eves | 99/404 |
| 5,066,505 | 11/1991 | Vos et al. | 99/404 |
| 5,131,835 | 7/1992 | Rini et al. | 426/509 |

OTHER PUBLICATIONS

American Association of Cereal Chemists, Inc. *Wheat: Chemistry and Technology*, vol. I (pp. 310,359) & vol. II (pp. 197–198), St. Paul: 1988.

*Primary Examiner*—George Yeung
*Attorney, Agent, or Firm*—Sheldon H. Parker

[57] ABSTRACT

A freezing process for manufacturing bagels, providing the taste and texture of fresh bagels is disclosed in which the dough is removed from the initial cooking process and immediately subjected to cool water, approximately 64° F. or less. The bagels are removed from the cool water and immediately exposed to moving air, thereby drying the excess moisture from the surface. The bagels are removed from the moving air and immediately placed in a freezer at a temperature less than 10° F. The process time from removing the bagels from the hot water to freezing preferably takes no more than approximately four minutes. A bagel cooking unit is disclosed which combines both the boiling and steaming methods. The unit has a water holding tank in the lower portion with a heater. A conveyer is positioned to enter above the water line of the water holding tank, to extend below the water line and to exit above the water line, allowing the bottom half of the bagels to be immersed in boiling water. A steaming system is positioned to evenly spray steam on said conveyer means, thereby steam cooking the top half of the bagels.

10 Claims, 3 Drawing Sheets

BREADFOOD FREEZING METHOD

BACKGROUND OF THE INVENTION

1. Field of the Invention

The method disclosed herein relates to a process for cooling and freezing bagels after boiling. The method allows the moisture to be retained within the bagel, which is baked on site as required.

2. Brief Description of the Prior Art

Breads are a food staple around the world and have been for centuries. In 1683 a Viennese baker made a hard roll to honor King John III Sobieski of Poland for saving Vienna from Turkish invaders. He called this roll "bugel". The roll spread throughout the Jewish communities in Eastern Europe, eventually being called the modern name of "bagel". In the early 20th century the bagel was brought to the Americans by Jewish immigrants. For decades the recipe was guarded by the Bagel Bakers Local 338 and the bagel kept its original texture.

In the 1950's the Thompson Bagel Machine was introduced. This revolutionized the bagel market as the machine was able to produce bagels 20 to 40 times the number which were able to be produced by hand. This broke the union hold on the production and bagels started spreading. In 1962 Lender's Bagels were baked, frozen and distributed nationwide to grocery stores. This started the slow rise of the bagel to its current popularity.

This popularity has not, however, come without a price. The original bagel was boiled in a kettle then baked, producing a crusty exterior and a chewy interior. Modern methods have, in many places, changed to a steam, bake method. This softens the bagel, which depending upon taste is either an asset or a detriment.

No matter what the method of cooking, the bagel has gained popularity and is entering a new phase. Many companies are baking and freezing the bagels, then shipping them to smaller stores, grocery stores, delicatessens, etc. The baked or steamed, then frozen and thawed bagels lose a substantial amount of interior moisture and exterior crispness during this process. The difference between the original bagel and the new, softer bagel has prompted the softer bagels to be labeled "California bagel" indicating a variation on the original bagel.

The problem of the short shelf life for bagels has been recognized and is addressed in U.S. Pat. No. 4,657,769 to Petrofsky et al. Petrofsky et al discloses a method of freezing boiled bagels utilizing a heated proofer and a wet proofer. Prior to boiling the formed bagels are placed in a heated proofer for approximately six minutes and are then transported to a wet proofer for 45 seconds. The wet proofer seals the bagel surfaces through exposure to a hot moist steam. The bagels are then cooked in boiling water and quick frozen in a $-15°$ F. freezer within eight minutes of being removed from the boiling water. The Petrofsky et al process produces a bagel which stays fresh for approximately six hours.

The instant method disclosed herein produces a bagel which is boiled, cooled, then frozen for shipment to bakeries, stores and delicatessens. The partially cooked bagel is thawed and baked on site, providing the original bagel taste and texture.

SUMMARY OF THE INVENTION

A freezing process for manufacturing bagels, providing the taste and texture of fresh bagels is disclosed in which the dough is shaped and proofed until the dough is relaxed. The bagel is boiled for about 2 minutes at about 212° F. The bagel is removed from the water and immediately subjected to cool water, approximately 64° F. or less. The bagels are either immersed in the cool water or sprayed with the cool water. The bagels are removed from the cool water and immediately exposed to moving air, thereby drying the excess moisture from the surface. The source of the moving air can either be a fan or an air knife. The bagels are removed from the moving air and immediately placed in a freezer at a temperature less than $-15°$ F. degrees. The process time from removing the bagels from the hot water to freezing preferably takes no more than approximately four minutes. The frozen bagels can then be thawed and baked.

A bagel cooking unit is disclosed which combines both the boiling and steaming methods. The unit has a water holding tank in its lower portion, and has a heater. An entrance and exit area is provided on opposite sides of the unit to allow a conveyer to pass through the unit. The conveyer is positioned to enter above the water line of the water holding tank, to extend below the water line and to exit above the water line. This provides for at least the bottom half of the bagels to be immersed in boiling water. Optionally the entire bagel shape can be submerged then floated and steamed. A steaming system is positioned to evenly spray steam on said conveyer means, thereby steam cooking the top half of the bagels. A pump is used to transfer the steam from the source to the sprayers. Preferably the conveyer is equipped with a method for turning the bagels to allow both sides of the bagel to be cooked by both methods. The conveyer contains a series of S shaped platforms, one end prevents the bagel from sliding and the second end extends below the surface of the conveyer. A stop bar is positioned to come in contact with the second end of said S shaped platforms. The stop bar causes the second end to rotate, thereby rotating the platform. As the platform rotates, the bagel is flipped onto the adjacent platform. This method allows the both halves of the bagel to be cooked in both boiling water and steam. The bagels are then taken, via the conveyer, to the cooling, drying and freezing areas as described above.

BRIEF DESCRIPTION OF THE DRAWINGS

The advantages of the instant disclosure will become more fully apparent when read in conjunction with the specification and the drawings, wherein.

DETAILED DESCRIPTION OF THE INVENTION

Figure 1:
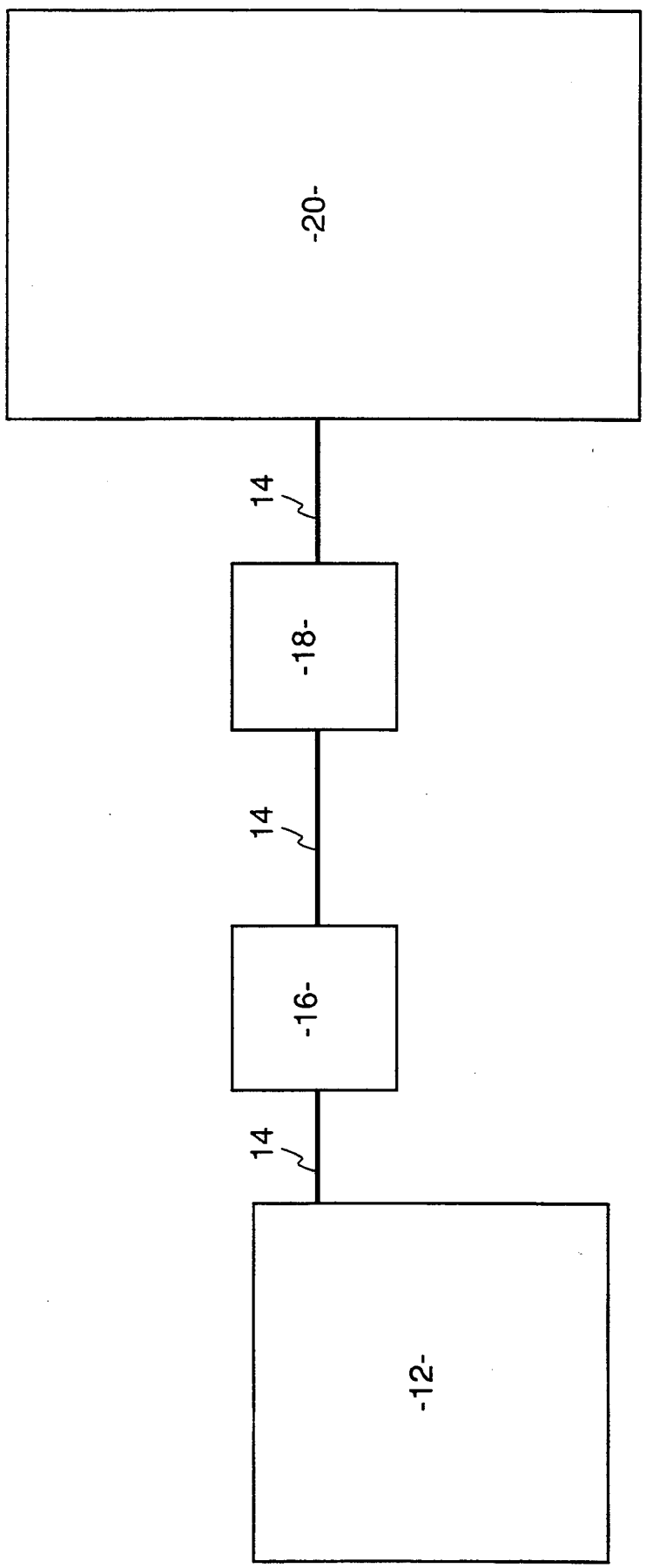
FIG. 1 depicts a flow chart showing the process of the present invention.

Bagels are made from a combination of water, yeast, malt syrup, sugar, salt and, preferably, high gluten flour, which is mixed thoroughly. Dough conditioners are added to achieve various desired results. Flours treated with enzymes capable of hydrolyzing the water-soluble arabinoxylan produced breads with loaf volumes generally slightly greater than those of the controls. The same enzymes also had a bread-softening effect without affecting any other quality characteristics. *Wheat: Chemistry and Technology, Volume I,* American Association of Cereal Chemists, Inc., St. Paul, Minn., U.S.A., 1988, p. 351. The enzymes bind, or hydrolyze, to the water soluble arabinoxylan compound, a bond which should release during freezing, thereby maintaining the softening effect. Approximately one half of the arabinoxylans in the wheat endosperm cell wall polysaccharides are water soluble. In wheat flour the endosperm cell wall polysaccharides are 88% arabinoxylans. Wheat flour contains its own enzyme in the form of $\beta$-amylase. "Its activity is sufficiently high to cause a 15-fold increase in level of maltose in dough within a few minutes after wetting. It rapidly depletes available substrates to provide a supply of fermentable sugar for yeast." *Wheat: Chemistry and Technology, Volume I,* American Association of Cereal Chemists, Inc., St. Paul, Minn., U.S.A., 1988, p. 210. The addition of cysteine releases additional $\beta$-amylase. Azodicarbonamide (ADA) is used as a maturing agent without bleaching action.

The dough is allowed to proof (or relax) for approximately 10 minutes at 78 to 80 degrees. The dough is then divided into three inch balls or strips and allowed to proof again, after which it is shaped into the circular configuration. The formed bagels are placed in a proofer which is maintained at 110 degrees F. with 80 percent humidity. The yeast in the dough is activated and the bagels double their size in approximately 35 minutes. From the proofer, the bagels are placed in boiling water for one minute per side. During boiling the yeast is still expanding, creating additional air pockets and making the bagels lighter. The boiling water also serves to maintain the bagel shape. The bagels can be steamed instead of boiled, however the preferred method is to boil the bagels in a kettle prior to baking. The steam produces a softer crust whereas the steamed bagel interior has less moisture than boiled bagels. The boiling prior to baking method provides the traditional chewy interior and crusty exterior that distinguishes the bagel from other rolls. The boiling process removes a portion of the natural soluble starch in the flour, providing a lower starch content than is usual for a bread product. Bagels that are steamed and then cooled as disclosed herein, have almost as much starch removed as those bagels which are boiled. Boiling also provides the advantage of maintaining the bagel's shape and preventing clumping, as the water allows the bagel to rise without hard surface resistance.

Most small bakeries cannot accommodate a boiling kettle and baking oven to produce fresh bagels. To solve this problem, a few companies ship the boiled bagels, frozen, to the bakeries for subsequent cooking. These bagels, although better than the boiled, baked, frozen version, still do not retain the shelf life of a freshly cooked bagel.

There are several undesirable changes which occur over time in breads, the over all process being called staling. This is firming of the crumb, increased opaqueness of the crumb, decreased soluble starch, loss of flavor and toughening of the crust. The changes that occur in the crust are clearly different from those that occur in the crumb. The toughening of the crust appears to be mainly associated with migration of water from the crumb to the crust. When bread is freshly baked, the crust is dry, containing 2-5% moisture. Under these conditions, it is friable and desirable. As water diffuses from the crumb, the crust loses its friability and becomes tough.

The changes that occur in the crumb appear to be much more complex. It was shown, almost 150 years ago, that the firming of bread crumb is not a drying phenomenon. Firming occurs even though no moisture is lost. Occurring over the same general time span as the firming is a recrystallization of the starch.

Bagels have a higher nutritional value than most other bread foods. The protein in one bagel is 11 grams as compared to 9.96 grams in mixed grain bread and 9.55 grams in wheat bread. Bagels also have 56 grams of carbohydrates as compared to 46.6 grams in mixed grains.

The rising of the dough is directly correlated to the temperature of the dough. "In the first stage of baking, the yeast continues to produce carbon dioxide, even at an increased rate, until it is inactivated by heat at a temperature of about 50° C. (450°–500° F.). As a result of the increasing saturated vapor pressure, water evaporates into the gas cells. Carbon dioxide and ethanol, produced by the yeast and dissolved in the dough water, also evaporate.

As a result of the temperature rise, dough viscosity first decreases, as in other materials in which no transformations take place. A temperature rise from 26° to 60° C. reduces the viscosity by a factor of five. In the center of the dough piece, viscosity is further decreased by the transport of water during baking form the outer to the inner parts; at 60° C., the increase in moisture content is of the order of 4% of the flour mass, resulting in a further reduction in the viscosity by a factor of about two. In this stage of baking, dough is a foam that is much more fluid than the fermenting doughs that are handled and can be observed in a bakery.

Above 60° C., dough viscosity increases rapidly as a result of the swelling of the starch granules and the exudation of amylose from them, which are part of the gelatinization process. Starch granules with widely different degrees of gelatinization, from swollen to disrupted granules, are found in bread crumb. The enormous increase in viscosity reflects the transformation of the predominantly viscous (fluid) dough into the predominantly elastic (solid) crumb and is mainly caused by starch gelatinization. The effect is increased by the polymerization of glutenins. "*Wheat: Chemistry and Technology* 197 (Y. Pomeranz ed., 1988) (citations and references omitted).

In the first stage of baking, carbon dioxide is released by diffusion only; after rupture of membranes, it flows outward through the holes Id. at 197–98.

The exposure to the heat, either through immersion into the hot water or steaming, starts the rising process. Three changes occur in the dough upon the temperature increase resulting from the immersion into hot water. The dough expands due to the gas volume increasing; the fluid dough is transformed to a solid bread crumb or crust and the foam structure of separate gas cells within the dough is changed to interconnected gas cells. This process continues until the cooking process is completed, at which time the bagels float and are edible. Initiating the rising in the hot water then placing the bagels into the oven to finish cooking and rising is efficient when the cooking process is completed initially. When freezing the bagels after the boiling stage, the continued rising after removal from the hot water can retard or impede rising during the baking stage.

Once removed from the hot water or steam, the bagels continue rising until the internal temperature is reduced; dehydration starts approximately one to five minutes after leaving the hot water. To arrest the rising and dehydration the bagels must be immediately cooled. As explained above, the moisture in the dough is critical for proper rising, as well as taste and texture. The cooling of the bagel also serves to help the bagel hold its shape and moisture. The hot bagel tends to dry out and shrivel.

Following the teachings of the instant disclosure, a flow chart is illustrated in FIG. 1. The bagels are either placed in a conventional boiling kettle 12 to be cooked in a procedure which is well known in the prior art, or steamed. For bagels that are steamed, it is recommended that wet steam be used for 30 seconds and dry steam used for 1 minute. The combination prevents the loss of shape which is so predominate with the steamed bagels. Once cooked for approximately two minutes, the bagels are removed from the conventional boiling kettle 12 and immediately placed in contact with cool water in the cooling area 16. Upon removal, the bagels can be manually moved from the boiling kettle 12 to the cooling area 16 or, alternatively, the bagels can be placed on a conveyer belt 14.

The cooling area 16 exposes the bagels to water at a temperature of less than approximately 64° F. in a humid atmosphere. The cooling area 16 can spray the water onto the bagels or alternatively the bagels can be placed in a container of up to about 64° F. water. Spraying the bagels with water overcomes the problem of loss of shape in steamed bagels when brought into contact with a large quantity of water, as would be needed to achieve optimum removal of concentrations of starch. In the event a container of cool water is used, the container must contain some monitoring means which will maintain the water at approximately 64° F. Bagels that have been steamed must be carefully handled if immersed in the cool water, as the steamed bagels do not retain their shape as well as the boiled bagels. The exposure to the cool water immediately reduces the temperature of the bagel, which in turn also starts the decrease in the yeast activity.

The conveyer belt 14 moves the bagels from the cooling area 16 to the water removal area 18. The excess water can be removed through use of a fan or air knife, whichever is convenient for manufacture. It is preferable that a moist air knife be used to remove surface water without dehydrating. The latent surface water will dissipate at its own rate, however the interior moisture will be retained. The rapid evaporation of the water further cools the bagels as well as preventing the formation of ice crystals during freezing.

It is possible, although not preferable, to by pass the cool down but it is still necessary to blow off water to prevent crystal formation. This may be necessary with steamed bagels due to the inability of the bagel to hold its shape and water contact must be limited or even eliminated. The water removal process must be done rapidly to prevent dehydration. An air knife using humid air can be used to remove the excess water, the humid air maintaining hydration. The prior art uses air drying which is time consuming and permits continued yeast activity. The rapid transition from hot to frozen improves the flavor and shelf life. Since moisture is the key to shelf life and taste of the bagel, air drying is undesirable since it permits loss of interior moisture.

The bagels are taken from the water removal area 18 to the freezer unit 20. The freezer unit is preferably maintained at a temperature between 10° to −30° F. It will take between 35 minutes and 1 hour to freeze the bagels, dependent on the quantity of bagels to be frozen and the size and type of the freezer. The bagels, when frozen should have a core temperature of 0° to −5° F. to maintain optimum freshness.

Freezer burn is at least in part due to dehydration which is prevented by retaining the interior moisture barrier. Air blow drying affects surface moisture, thereby preventing crystallization but does not remove the interior moisture. The retention of interior moisture is due to the short time period of drying and selective drying of only the surface water. By way of contrast, air drying removes critical interior moisture.

The optimum time from removal from the conventional boiling kettle 12 to the freezer unit 20 is 2 to 6 minutes. Bagels that are frozen within that time frame will maintain 40%–60% of their moisture.

The use of flash freezing can be used after the cool down step, provided the time period for the flash freezing is sufficiently short to avoid the total freezing of the bagel. The flash freezing of the outer strata of the bagel locks in moisture and stops the yeast from rising. Excessive freezing can result in freeze shock to the bagels and loss of moisture. Completion of the freezing can be rapid or slow, once the bagel surface layer is frozen. The freezing process can be replaced by a time controlled liquid nitrogen bath.

The above method is disclosed using a boiling kettle, however a steam table can alternatively be used to produce the softer "California" bagels. The use of the conveyer belt allows the system to be more automated, however, the bagels can be transferred by hand.

The cooling of the bagels with water, air drying and then freezing, all within a very short time span, preferably 3 minutes, dramatically increases the quality of the bagel as well as the shelf life after baking.

Figure 2:
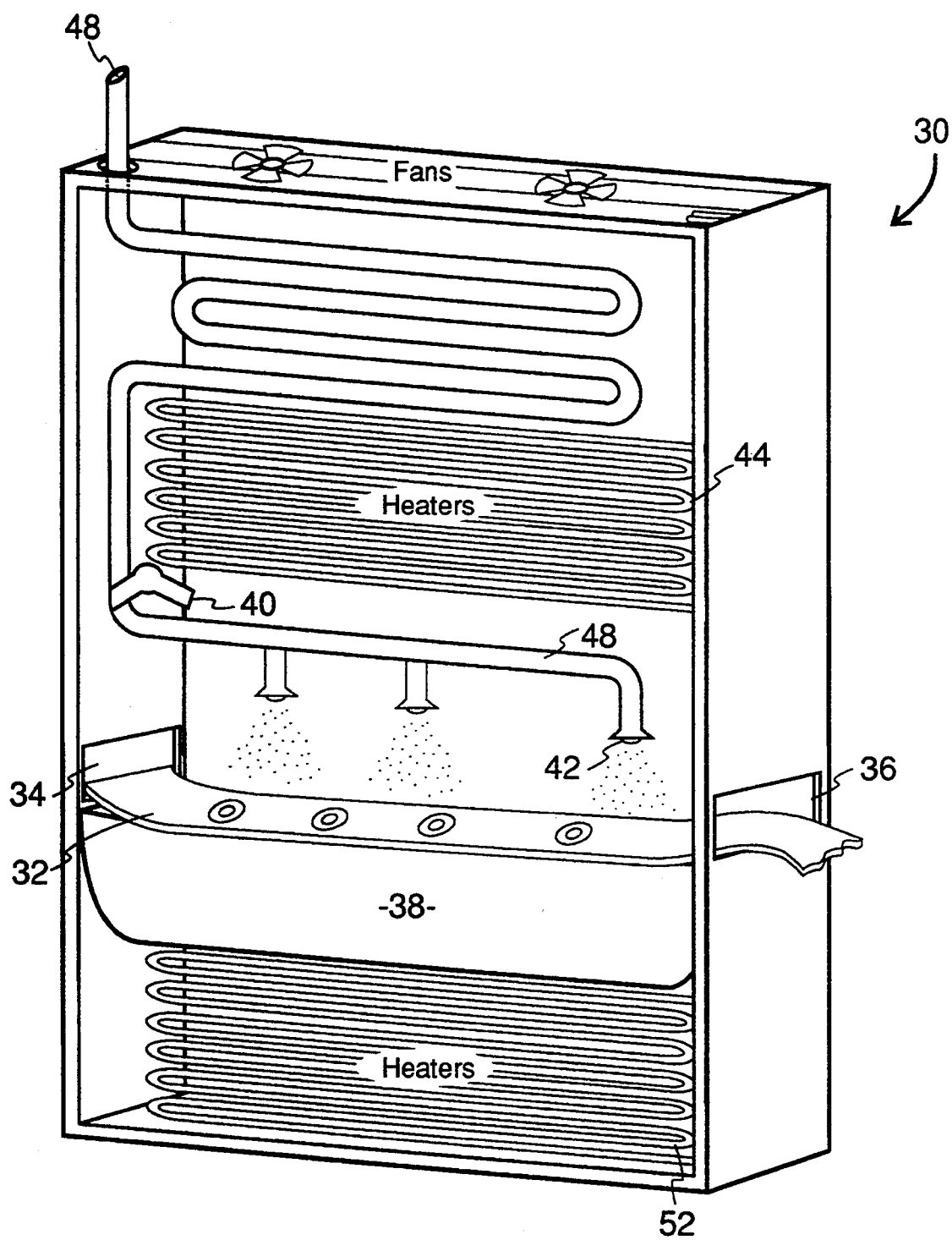
FIG. 2 depicts a pictorial view of a steamer as used in an alternative embodiment of the process of the present invention.

In FIG. 2 an alternative way of cooking a bagel is disclosed. Steaming the bagel is faster than boiling, however, as previously discussed, steaming does not provide the texture provided by boiling. This combination provides a moister bagel, produced by steaming and a less starchier bagel, due to the starch removal during boiling. The texture of the steamed/boiled bagel is softer than the traditional bagel, while not being as soft as the "California" bagel. The boiling unit 30 combines the steam and boiling cooking methods in one process. The bagels are placed on a conveyer 32, which runs through the boiling unit 30, from entrance 34 to exit 36. The water holding tank 50 in the lower interior of the boiling unit 30 is filled with boiling water 38, which is maintained at the boiling point by heaters 52. The heaters 52 can be of any design which is known in the art for use with water. A thermostat (not shown) can be placed in the boiling water 38 which controls the heaters 52 or alternatively the heaters 52 can be manually set at a temperature to maintain the water at the boiling point. The entrance 34 and the exit 36 are raised from the level of the boiling water 38 to prevent the water from spilling out. The conveyer 32 is a manufactured from a flexible material which can bend to accommodate the raised entrance 34 and exit 36. The conveyer 32 can run on a track of any other method of support which is convenient for manufacture. The conveyer 32 must be lowered, once in the boiling water 38, to a level which brings the lower half of the bagels in contact with the boiling water 38 in the water holding tank 50.

The boiling unit 30 is equipped with steam heads 42 which allow for steam to be sprayed down onto the upper halves of the bagels. The steam is pumped from the water coils 46, through use of a pump 40, to the feed pipe 48. The feed pipe 48 carries the steam, under pressure, to the steam heads 42. The water is fed in through feed pipe 48 to the water coils 46 where it is heated by heaters 44 to produce steam, which is fed to the steam heads 42. This is only one method of producing the steam for use in cooking the bagels. Other methods can be utilized and will depend upon the size of the unit.

Figure 4:
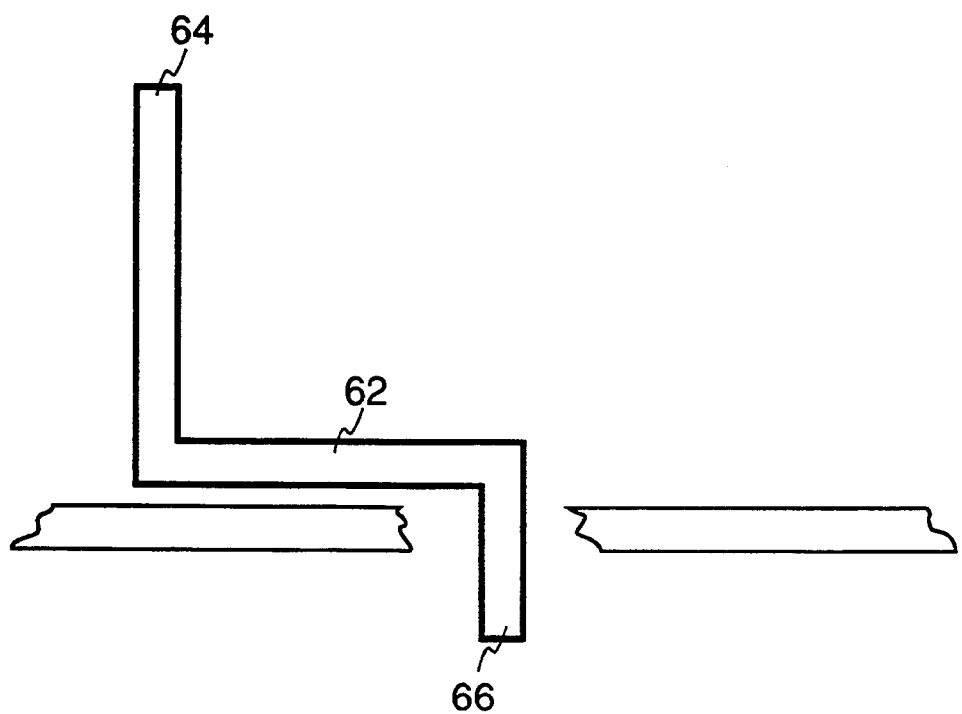
FIGS. 3 and 4 depict side views of conveyer elements.
Figure 3:
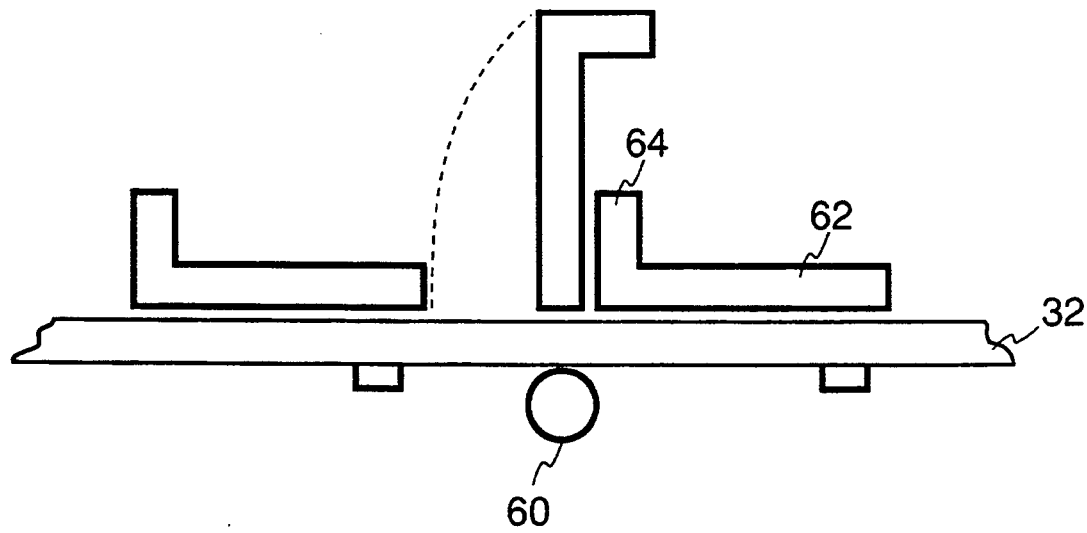

The bagels are brought into the water holding tank 50 on the conveyer 32 and boiled on the underside while being steamed on the exposed half through the steam pumped through the steam heads 42. At the mid point, the bagels are flipped over to allow the portion which was boiled to be steamed and the steamed portion to be boiled. This provides the advantage of decreased cooking, due to the steam, while maintaining the texture of the boiled bagel. The size of the boiling unit 30 and the speed of the conveyer 32 must be properly adjusted to allow for sufficient cooking time. FIGS. 3 and 4 illustrate more clearly the configuration of the conveyer 32. The conveyer 32 is provided with platforms 62 which are S shaped, having a stop 64 and a lever 66. The stop 64 and the lever 66 are at approximately right angles to the platform 62 and are preferably manufactured as a one piece unit. The platform 62 is placed in movable contact with the conveyer 32 with lever 66 extending through the conveyer 32. The area in which the lever 66 extends through the conveyer 32 can be reinforced, dependent upon the material used to manufacture the conveyer 32. The lever must be allowed to move freely within the conveyer 32 and if the conveyer 32 material is overly flexible, it may be advantageous to use a rectangular section of material, such as stainless steel, to reinforce the area and allow for ease of movement. The bagel is placed on the platform 62, either manually or in combination with a forming machine, and moved to the entrance 34 of the boiling unit 30. The stop 64 prevents the bagel from sliding backward due to the water force created by the movement of the conveyer 32. At approximately the mid-way point, the lever 66 comes in contact with the stop bar 60, which is securely placed in the boiling unit 30. The stop bar 60 causes the lever 66 to rotate as it passes across the stop bar 60. The rotation of the lever 66 causes the platform to rise at a 90° angle, thereby flipping the bagel to the adjacent platform 62. The platform 62 needs to be dimensioned greater than the diameter of a bagel, approximately the bagel diameter plus the height stop 64. This dimensioning prevents the bagel from being trapped against the height stop 64 of the adjacent platform 62 when it is turned. The current created by the movement of the conveyer 32 in the boiling water 38, forces the bagels against the height stop 64, allowing the bagel to clear the height stop 64 on the adjacent platform 62. Once clear of the stop bar 60, the empty platform 62 returns to its original position adjacent to the conveyer 32 and is thereby in a position to receive a turned bagel. When initially starting up the system each time, the first platform to enter the boiling unit 30 is left empty.

The conveyer 32 then moves the bagels to the cooling area and they are cooled, dried and frozen as described heretofore.

The bagels prepared by the disclosed method can be stored and/or shipped frozen and later thawed. Once thawed, the bagels are cooked at 350° for approximately 10 minutes or until golden. The bagels once boiled are sufficiently cooked and can be eaten, however the baking provides the golden, crisp crust that is such an integral part of a bagel.

What is claimed is:

1. A freezing process for producing bagels having the taste and texture of fresh bagels, comprising the steps of:
    a. preparing and shaping bagel dough into the form of at least one bagel shape;
    b. proofing said bagel shape until said dough is relaxed;
    c. boiling the prepared bagel shape in water at about 212° F., for about ½ to 2 min;
    d. removing said bagel shape from said water and immediately exposing said bagel shape to cool water;
    e. removing said bagel shape from said cool water and immediately exposing said bagel shape to moving air, thereby drying the excess moisture from the surface of said bagel shape;
    f. removing said bagel shape from said moving air and immediately placing said bagel shape in a freezer at a temperature less than about 10 degrees.

2. The process of claim 1 wherein the process steps from (c) through step (e) takes no more than approximately four minutes.

3. The process of claim 1 wherein said cool water has a temperature of less than 64° F.

4. The process of claim 3 wherein said bagels are immersed in said cool water.

5. The process of claim 3 wherein said bagels are sprayed with said cool water.

6. The process of claim 1 wherein the source of said moving air is a fan.

7. The process of claim 1 wherein the source of said moving air is an air knife.

8. The process of claim 1 wherein said bagel shape is moved from step (d) to step (f) on a conveyer belt.

9. The process of claim 1, further comprising the step of thawing a frozen bagel shape and baking said bagel shape at a temperature of about 350° to 400° until said bagel shape is fully baked.

10. The product produced by the process as described in claim 1.

* * * * *